(12) United States Patent
Gkaintatzis

(10) Patent No.: US 11,612,530 B2
(45) Date of Patent: Mar. 28, 2023

(54) DEVICE FOR THE SIMULATION OF A SEATED POSITION IN A WHEELCHAIR

(71) Applicant: Dimitrios Gkaintatzis, Salonika (GR)

(72) Inventor: Dimitrios Gkaintatzis, Salonika (GR)

(*) Notice: Subject to any disclaimer, the term of this patent is extended or adjusted under 35 U.S.C. 154(b) by 511 days.

(21) Appl. No.: 16/637,483

(22) PCT Filed: Jul. 30, 2018

(86) PCT No.: PCT/GR2018/000036
§ 371 (c)(1),
(2) Date: Feb. 7, 2020

(87) PCT Pub. No.: WO2019/030543
PCT Pub. Date: Feb. 14, 2019

(65) Prior Publication Data
US 2020/0249746 A1 Aug. 6, 2020

(30) Foreign Application Priority Data
Aug. 8, 2017 (GR) .............................. 20170100371

(51) Int. Cl.
*A61G 5/10* (2006.01)
*G06F 3/01* (2006.01)
(Continued)

(52) U.S. Cl.
CPC .......... *A61G 5/1067* (2013.01); *A47C 31/126* (2013.01); *A61G 5/1005* (2013.01);
(Continued)

(58) Field of Classification Search
CPC ..... A47C 31/126; A47C 5/1056; G06F 3/011; A61G 5/061; A61G 5/1059; A61G 5/128
See application file for complete search history.

(56) References Cited

U.S. PATENT DOCUMENTS 5,060,393 A 10/1991 Silverman
7,004,885 B1 2/2006 Wu et al.
(Continued)

FOREIGN PATENT DOCUMENTS

CN 106994072 A 8/2017
EP 2919622 A1 9/2015
(Continued)

OTHER PUBLICATIONS

Marc St-Georges; Eng Msca; Valiquette Claude; Drouin Gilbert, Computer-aided design in wheelchair seating, Journal of Rehabilitation Research and Development, vol. 26, No. 4, May 29, 2006.

*Primary Examiner* — Timothy J Brindley
(74) *Attorney, Agent, or Firm* — David Guerra

(57) ABSTRACT

The invention relates to the field of wheelchairs and has been designed for the measurement of parameters for the adjustment of a seated position of the user. It relates to a device for the simulation of a seated position in a wheelchair, which includes a seat backrest (1) adjustable horizontally, vertically and during its reclination, two side seat pans (27) with armrests (3) with adjustable distance, a foldable seat pan (2) with adjustable reclination, two wheels (4) with adjustable horizontal and vertical position, and a footrest (5) with adjustable vertical position and its reclination, at least one electric motor or an electric piston (15) for the adjustment of the position of the adjustable components, an electronic circuit with special software for the control of the motors and the display of the measurements, as well as a virtual reality software. With this device, it is possible to measure the adjustment parameters for the seated position of a wheelchair user automatically and digitally by means of a software which is installed in the simulation device.

21 Claims, 13 Drawing Sheets

(51) Int. Cl.
*A47C 31/12* (2006.01)
*G06F 3/04815* (2022.01)
*G09B 9/00* (2006.01)
*A61G 5/12* (2006.01)

(52) U.S. Cl.
CPC ......... *A61G 5/1056* (2013.01); *A61G 5/1059* (2013.01); *A61G 5/1062* (2013.01); *A61G 5/128* (2016.11); *G06F 3/011* (2013.01); *G06F 3/04815* (2013.01); *G09B 9/00* (2013.01)

(56) References Cited

U.S. PATENT DOCUMENTS

| | | | |
|---|---|---|---|
| 10,806,649 B1* | 10/2020 | Cox | A61G 5/065 |
| 11,166,861 B2* | 11/2021 | Pitt | A61G 5/10 |
| 11,285,059 B1* | 3/2022 | Alexander | A61H 3/04 |
| 2007/0152427 A1* | 7/2007 | Olsen | B60L 15/20 |
| | | | 280/649 |
| 2015/0209207 A1* | 7/2015 | Cooper | A61G 5/128 |
| | | | 701/49 |
| 2017/0056259 A1* | 3/2017 | Olsson | A61G 5/042 |
| 2017/0172823 A1* | 6/2017 | Ishikawa | A61G 5/061 |
| 2017/0253081 A1* | 9/2017 | Bleau | B60B 33/04 |
| 2019/0133856 A1* | 5/2019 | Dowding | A61G 5/1059 |
| 2019/0231617 A1* | 8/2019 | Cazali | A61G 5/068 |
| 2020/0268578 A1* | 8/2020 | Fleming | A61G 5/104 |
| 2020/0276066 A1* | 9/2020 | Young | A61G 5/1059 |

FOREIGN PATENT DOCUMENTS

| | | | | |
|---|---|---|---|---|
| GB | 2508046 A | * | 5/2014 | ......... A47C 31/126 |
| WO | 2006116834 A1 | | 11/2006 | |

* cited by examiner

DEVICE FOR THE SIMULATION OF A SEATED POSITION IN A WHEELCHAIR

CROSS-REFERENCE TO RELATED APPLICATIONS

This application is an U.S. national phase application under 35 U.S.C. § 371 based upon co-pending International Application No. PCT/GR2018/000036 filed on Jul. 30, 2018. Additionally, this U.S. national phase application claims the benefit of priority of co-pending International Application No. PCT/GR2018/000036 filed on Jul. 30, 2018 and Greece Application No. 20170100371 filed on Aug. 8, 2017. The entire disclosures of the prior applications are incorporated herein by reference. The international application was published on Feb. 14, 2019 under Publication No. WO 2019/030543 A1.

BACKGROUND

Technical Field

The invention relates to the field of wheelchairs and has as an object a device for the simulation of a seated position in a wheelchair which automatically determines dimensions and other physical parameters of the seated user, in order to accurately capture the dimensions according to which the personalized wheelchair for said user must be manufactured. The data resulting from this measurement is electronically sent by virtue of relevant software, which also falls within the scope of the invention, to a selection device either of a user or a third person as, e.g., a mobile phone, a tablet, a computer.

Background Description

It is well known that the dimensions of the wheelchairs (width, seat depth, height above the ground, wheel diameter, reclination, etc.) are very important for the comfort of the seating position, the ease of movement of an individual on a wheelchair, his physical integrity and resistance to his subsequent good physical condition, given that wheelchair mobility burdens other parts of the body (e.g., hands, shoulders).

Today, in order to obtain a wheelchair, someone must follow the following procedure: the user addresses to a wheelchair dealership, which through its employees or representatives, i.e. operators, operator assistants and advisors, takes the user's measures with a measuring tape and/or a ruler. Based on these measurements, a wheelchair is chosen from the ones that said dealership already has, which will be as close as possible to the user measurements that preceded as above. By virtue of and based on the measurements to be made also on the ("measuring tape") wheelchair-standard, according to the wishes of the user, the wheelchair is ordered and manufactured in a second time by the wheelchair manufacturer to which the person concerned will contact.

A first disadvantage of this solution is that the measurement of the user's parameters is based on a third person. The assessment of the comfort and safety of the user is done through the dialogue between the patient and the assistant operator—representative or employee, in the sense that the second one asks the first one if, e.g., the position of the arms at the point x satisfies him or not. However, those questions are always asked without the user being able to have an absolute sense of how his future wheelchair will be, while he is based on the measurements made and the limited feeling he has with a wheelchair approaching his future one. In this way, of course, a position satisfying the user each time is found, but always comparatively and never essentially with the ability to capture the perfect position of his body, given that certain components even of the wheelchair that functions as above as "measuring tape" are stabilized or minimally variable.

A further disadvantage is that the measurement is done with a ruler or a measuring tape by third persons and therefore it may contain errors as human factor enters. These possible mistakes will affect the final form of the ordered individualized wheelchair.

Another disadvantage is the relative position of the wheels in relation to the wheelchair user's body and hands. In particular, this relationship is also very important because it affects the way the wheelchair user rotates the wheels with his hands in order to move. The position of the wheels is minimally or not at all modifiable in the future wheelchair and the arrangement to be decided in essence will be almost established for the future in the same wheelchair. According to the anthropometric features of the user and his medical history, there are relative wheel positions more suitable for the individual wheelchair user, with the aim of less strain and fatigue during transportation with a wheelchair.

In order to find the ideal relative position of the wheel shaft that creates less fatigue and hence less physical strain during transportation with a wheelchair, a driving simulation with manual wheel activation by the wheelchair user is required by testing in many relative positions of the wheel shaft. In this way, the user, in essence, is testing potential forwarding positions without, of course, these tests being able to be assimilated to the absolutely ideal position. The disadvantage is that the wheelchair user must place an existing wheelchair in the simulator in order the tests to be performed. The existing wheelchair obviously appears that it is not his own personalized wheelchair. Consequently, the simulation will be carried out in essence on irreducible data.

Also, over the years the user has developed a specific way of forwarding the wheelchair that can cause him bodily problems. This makes him want the position of the shaft, the length of the backrest and other features at the points he has already been used to, but this habit in said points obviously preserves the bodily problems than solving them. The user cannot try a different shaft position because the order of the wheelchair is specific, it includes a specific shaft position, and this will not be able to change unless he orders a new wheelchair.

Another disadvantage has to do with the fact that the user cannot be trained in how to forward the wheelchair, as the "measuring tape" wheelchair will have significant differences in relation to his future wheelchair.

BRIEF SUMMARY OF THE PRESENT TECHNOLOGY

The inventor has constructed a device for the simulation of a seated position in a wheelchair that enables the measurement of the adjustment parameters of the seated position of a wheelchair user automatically and digitally by means of software installed in the simulation device and is also an object of the invention. The data collected from this measurement can be sent electronically to a computer or another controller equipped with a display system, such as a mobile phone or a small touchscreen laptop.

The object of the invention is, first of all, a device for the simulation of a seated position in a wheelchair that includes the following adjustable components:

A seat backrest, whose:
- horizontal position, which defines the depth of the seated position, can be adjusted by a means for the horizontal adjustment of the backrest,
- vertical position, which defines the height of the backrest, can be adjusted by a means for the vertical adjustment of the backrest, and
- inclination can be adjusted by a means for the adjustment of the backrest inclination.

Two vertical side seat pans with armrests whose horizontal distance, which defines the width of the seated position, can be adjusted by a means for the horizontal adjustment of the position of the vertical side seat pans.

A foldable widthwise seat pan, whose reclination can be adjusted by a means for the reclination adjustment of the seat pan.

Two wheels whose horizontal position, which defines the horizontal distance of the backrest and the wheel shaft of the wheelchair, can be adjusted by a means for the horizontal adjustment of the shafts and the vertical position, which defines the final height of the wheelchair, can be adjusted by a means for vertical adjustment.

A footrest, whose vertical position can be adjusted by a means for the vertical adjustment of the footrest base, and the reclination can be adjusted by a means for the adjustment of the footrest inclination.

The device for the simulation of a seated position in a wheelchair that includes at least one means for position measurement of at least one position of at least one adjustable component.

The device for the simulation of a seated position in a wheelchair according to the invention includes, secondly, also the software for determining all the positions of the components and makes possible the determination of the following dimensional parameters which are used for the manufacture of a personalized wheelchair (FIG. 11):

Width of seated position of seat.
Horizontal depth of seated position of seat.
Seat backrest height.
Seat backrest reclination.
Distance between seat pan and footrest.
Footrest reclination.
Front vertical distance between seat pan and ground.
Rear vertical distance between seat pan and ground.
Seat pan reclination.
Horizontal distance between seat backrest and wheel shaft.

Using the above adjustments, the individual on the simulation device or a third person (trained, of course, to use the simulation device), can define the most suitable dimensions of the future personalized wheelchair for the individual on the simulation device.

The simulation device is equipped with an electronic circuit and a customized software that controls all the adjustment means and calculates the dimensions based on the position of the moveable components.

The simulation device is also equipped with sensors that allow the electronic circuit with the software to read the exact position of the adjustable components.

The operator of the simulation device can use as a controller for the control of the adjustment means, as well, as for the projection and storage of the dimensions, a computer or any other device which should have a display system and should be able to connect to a wired or wireless net as, for example, a common mobile phone or a common touchscreen computer.

The invention relates also to a method for determining the adjustment positions of the components of a device for the simulation of a seated position in a wheelchair according to any of the alternative embodiments of the device for the simulation of a seated position that have been previously described.

This method for the determination of the adjustment positions of the components of a device for the simulation of a seated position in a wheelchair includes the following steps: A first step of adjusting the horizontal distance of the vertical side seat pans with the armrests, a second step of adjusting the horizontal position of the seat backrest, a third step of adjusting the vertical position of the seat backrest, a fourth step of adjusting the vertical position of the footrest, a fifth step of adjusting the reclination of the seat position, a sixth step of adjusting the vertical position of the wheel shaft, a seventh step of adjusting the horizontal position of the wheel shaft, an eighth step of adjusting the reclination of the seat backrest and a ninth step of adjusting the footrest reclination.

With this invention, i.e., with the manufacture of, a wheelchair simulation device, the ability to order a completely personalized, and therefore ideal for the individual user, wheelchair (e.g., seat height, width, depth, relative position of wheels, etc. will be perfectly adapted to the user's physiometry) is fulfilled. Dimensional accuracy will help to give the user the wheelchair that provides him with a wealth of features and benefits such as comfort, safety, fast and flexible movement, relatively poor physical strain.

In addition to that, the user is able to forward the wheelchair he will order and feel his personal strain on it.

Also, with this invention it is possible to calculate in advance the energy consumption that the user will use to forward his movement ordered, while of course he may propose changes to it in order to decide his best position on his own wheelchair. It is possible to record the way in which the force is applied to the wheels and to find the mistakes that may lead to strain. The ability to record his movement onto the new wheelchair without having it already is the basis for preventing mistakes in the new wheelchair.

Concurrently, the user has the ability to check different positions of the shaft, the backrest and other data that may be more appropriate or necessary and with the new adjustment to reduce his strain.

Also, the user can be informed about the adjustment of the components his future wheelchair will possess.

The simulation and the ability given by the invention to the user to use the new wheelchair in order to capture the movement and understand the difference in the new measurements and settings is another advantage and innovation.

Also, using the simulator, the user can be trained to his new position on the wheelchair and be prepared to use it.

In addition, the simulator can also be used as a training tool for using the wheelchair in patients who have to change the kinetic model they use to forward the wheelchair.

Another very important advantage of the invention, which has a long-term perspective, however extremely existent, is the appreciable limitation of the bodily strains to which all wheelchair users are subject, given the strain of other members of the body, and mainly their upper limbs, due to the manual movement of the wheelchair wheels. By manufacturing—according to the invention—a completely personalized, virtually ideal wheelchair, the wheelchair user will be subjected to as little physical strain as possible, given that the total strain will be deducted from the improper or absolutely proper position of the user on the wheelchair and what remains is the never absent physical fatigue by the movement of the hands for the movement of the body and the wheelchair given, of course, the disability and the wheelchair.

The individual on the simulation device or a third individual can determine the position of the adjustable components that is judged beforehand as the most suitable for the individual on the simulation device for his future personalized wheelchair.

For all the above reasons, it will be possible to order an almost entirely personalized wheelchair and fully tailored to the needs and physical dimensions of the individual user. This device can determine the dimensions of the user immediately and quickly without mistakes. The invention can calculate the mode of propulsion of the wheelchair, the energy expenditure and thus mistakes and future modifications can be avoided. All of the above are accomplished using the described invention.

Another advantage of the invention is that the position of the adjustable components-can be displayed in real time, the dimensional parameters can be readily calculated and saved automatically in the phone or computer memory. In this way, there can be stored dimensions per individual in order to make it easy for the simulator to re-convert to the dimensions required for one person, if required.

Yet another advantage is that the stored positions of the adjustable components can be reset from the computer and all the moveable parts of the simulation device can be reset to the stored dimensions. In this way, it is ready for the next measurement.

In this invention, at least one means for adjusting at least one position of at least one adjustable component is an electric motor or electric piston. Thus, positioning of the parts can be done by the individual himself on the simulation device or by a third person in a fast, accurate and comfortable way.

A further advantage is that the device for the simulation of a seated position in a wheelchair according to the invention comprises a magnetic and/or aerodynamic brake, mounted on each wheel in order to simulate the resistance during the movement of a real wheelchair, and a rotation sensor which is mounted on at least one wheel or at least one wheel brake. The device can, with the appropriate software, be used for stress tests and other medical examinations aimed at evaluating the cardiorespiratory function of the user (e.g., stress test).

Thus, it is possible to assess the strength and fatigue of the wheelchair user during the manual operation of the wheels of the wheelchair for specific wheel positions. It is possible to determine the position of the wheels best suited to the morphology of each wheelchair user. Concurrently, comparable sensors can measure the energy costs of each user in different positions and adjustments.

According to an alternative embodiment, the device for the simulation of a seated position in a wheelchair includes at least one vertical load sensor. Thus, it is possible to determine the weight of the individual.

According to another variant of the invention, the device for the simulation of a seated position in a wheelchair comprises at least one or more load sensors.

These load sensors determine the total weight of the individual on the simulation device and the position of the center of gravity on the horizontal plane. The position of the center of gravity can be used to calculate the required power of the upper limbs of the above individual in order to be able to lift a wheelchair to the rear wheels.

In summary, the advantages resulting from the use of said device and the novelties it introduces are:

Simulation of proper posture for the user concerned.

The user has the ability to feel at every point in his body the ideal posture, thus ensuring the correct measurements before manufacturing or buying a new wheelchair.

It enables the user to find the most suitable seat position so that with the lowest muscular force on the wheel he gains the maximum distance traveled.

It demonstrates to the user, with a mathematical in essence way, the position and adjustment that has the lowest energy cost when forwarding the wheelchair.

By using the simulation, the user can try to navigate through roads and narrow streets discovering the potential of his future wheelchair.

It enables new users and children to be trained in the handling of a wheelchair.

In the process of somatometric measurements, it abolishes traditional methods of measuring with measuring tapes with centimeter precision, replacing them with digital measurements with millimeter precision.

It reduces the time of somatometric measurements per individual from about 2 hours to about 20 minutes and additionally with the ability to save the measurements.

It enables each manufacturer of a personalized wheelchair to always receive the correct dimensional parameters, avoiding the human error by inexperienced dealers, bodies or organizations.

It assures manufacturers of customized wheelchairs that each wheelchair will be ideal for the user who has ordered it.

It provides the ability to train new users how to use a wheelchair.

It enables reliable measurements to be made for the cardiorespiratory function of the patient by using suitable sensors.

It limits the body strain and consequently the excessive strain of the users.

BRIEF DESCRIPTION OF THE DRAWINGS

The invention will be better understood by reading the description of FIGS. 1-11 attached.

DETAILED DESCRIPTION OF THE PRESENT TECHNOLOGY

Figure 1:
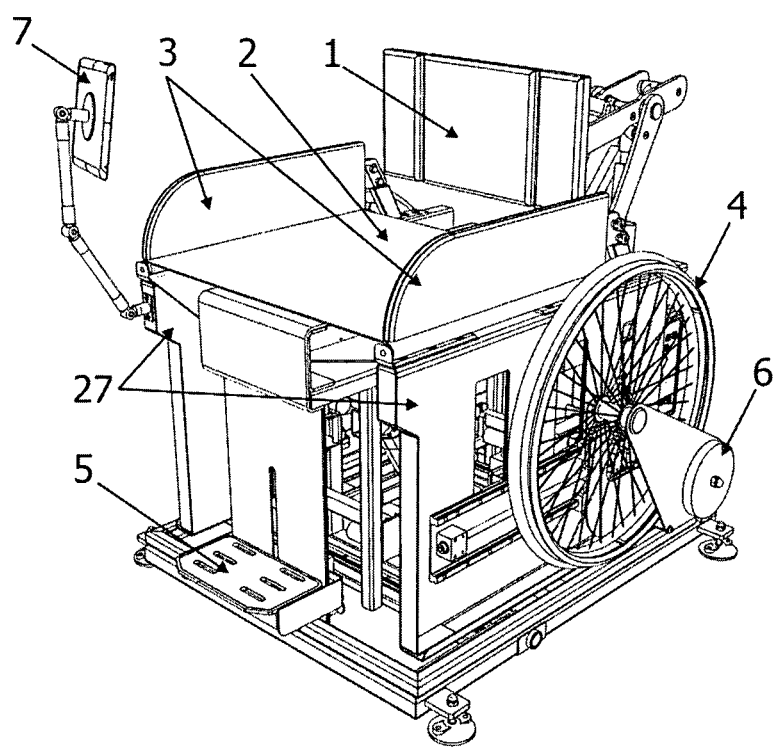
FIG. 1 is a front perspective view of a device for the simulation of a seated position in a wheelchair according to a preferred mode to embody the invention, with a touch-screen computer for the handling of the device and the display of the measurements.

FIG. 1 is a front perspective view of a device for the simulation of a seated position in a wheelchair according to a preferred mode of embodiment. The device includes adjustable position components, such as a seat backrest 1, a foldable seat pan 2, vertical side seat pans 27 with armrests 3, wheels 4, a footrest 5, magnetic brakes 6. The simulation device includes a computer or touchscreen computer or mobile phone in a wired or wireless way for its handling 7.

Figure 2:
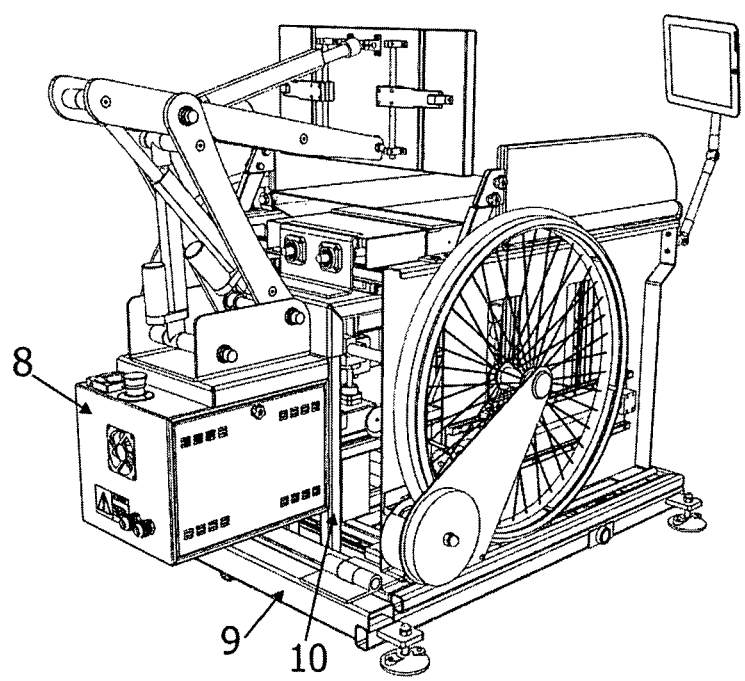
FIG. 2 is a rear perspective view of a device for the simulation of a seated position in a wheelchair according to the invention.

FIG. 2 is a rear perspective view of a device for the simulation of a seated position in a wheelchair according to the invention. The device includes a supply and electronic components box 8, a fixed frame 9, a reclining modular frame 10.

Figure 3:
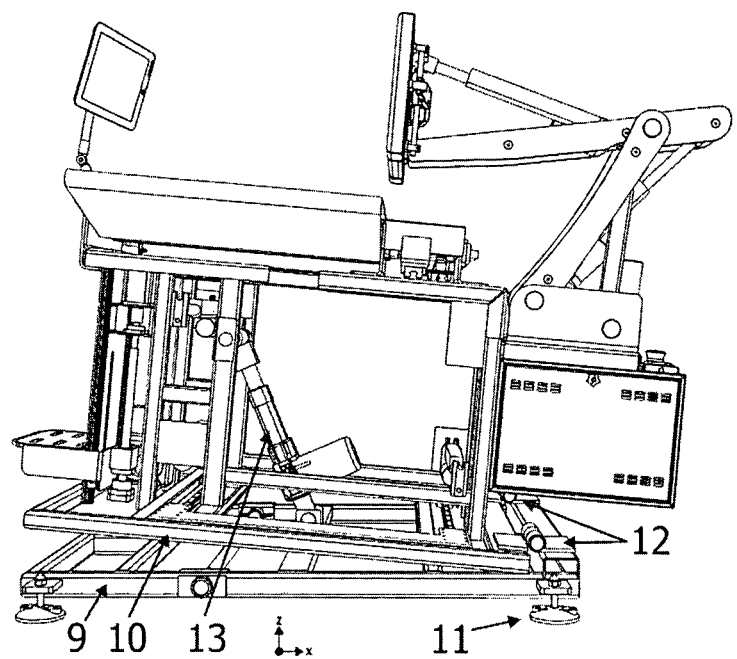
FIG. 3 is a detailed side view of the mechanism for the adjustment of seat reclination.

FIG. 3 is a detailed side view-of the mechanism for the adjustment of seat reclination. Said mechanism consists of a fixed frame 9, which is in contact with the ground or has small wheels to facilitate its transportation 11. In the fixed frame 9 is articulated a modular frame 10 whose reclination in relation to the fixed frame 9 is adjustable by connecting two swivels 12 and an electric piston 13. With the movement of the electric piston the reclination of the frame 10 is adjusted. The electric piston 13 contains an electronic sensor that measures its position. The electronic board with the special software, knowing the exact position of the electric piston 13 and all the other moveable adjustable components can calculate with a millimeter precision:

The front vertical distance between the foldable seat pan and the ground.

The rear vertical distance between the seat pan and the ground.

The reclination of the foldable seat pan.

The horizontal distance between the seat backrest and the wheel shaft.

Figure 4:
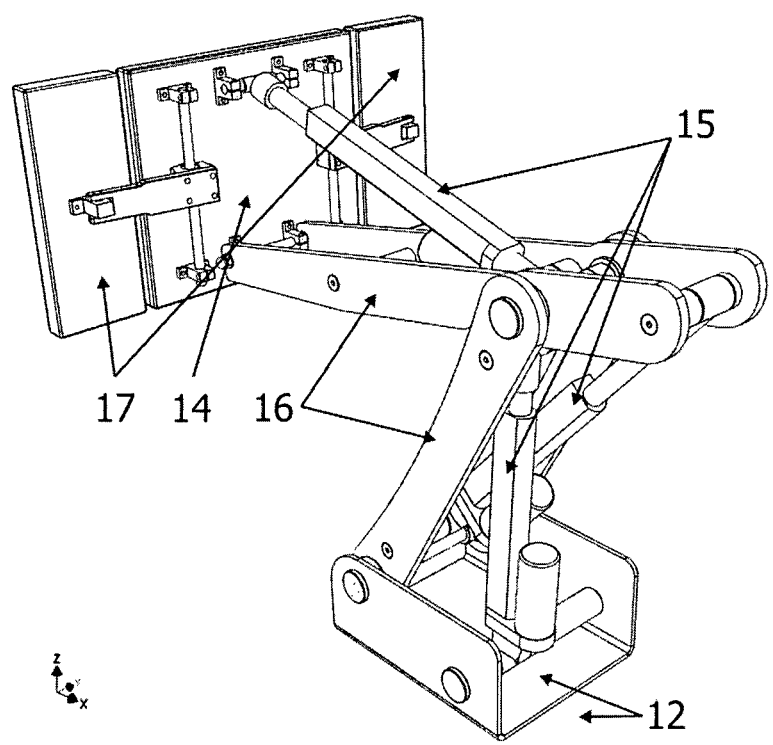
FIG. 4 is a detailed rear perspective view of the mechanism for the adjustment of the seat backrest.

FIG. 4 is a detailed rear perspective view of the mechanism for the adjustment of the seat backrest. The seat backrest 14 is adjustable in the vertical distance from the seat, in the horizontal distance from the front point of seat and in its reclination. This is achieved by virtue of three electric pistons 15 which possess digital sensors for position reading. The backrest is fixed in arms 16 and in one of the three electric pistons 15. The electronic board with the special software located in the supply and electronic components box 8 has the ability to adjust the exact position and reclination of the three electric pistons in order to achieve the desirable position and reclination of the backrest. The electronic board with the special software, knowing the exact position and reclination of the backrest, can calculate with millimeter precision:

The horizontal depth of the seated position of the seat.

The height of the seat backrest.

The reclination of the seat backrest.

The horizontal distance between the seat backrest and the wheel shaft.

Behind the backrest there are fixed with two swivels two projections of the backrest 17. The rotation of the projections in order to come to the same level with the backrest is done manually. Their goal is to make possible that the surface of the backrest becomes bigger, if necessary for the specific individual that happens to sit on the simulator in order to obtain a better support of his back.

Figure 5:
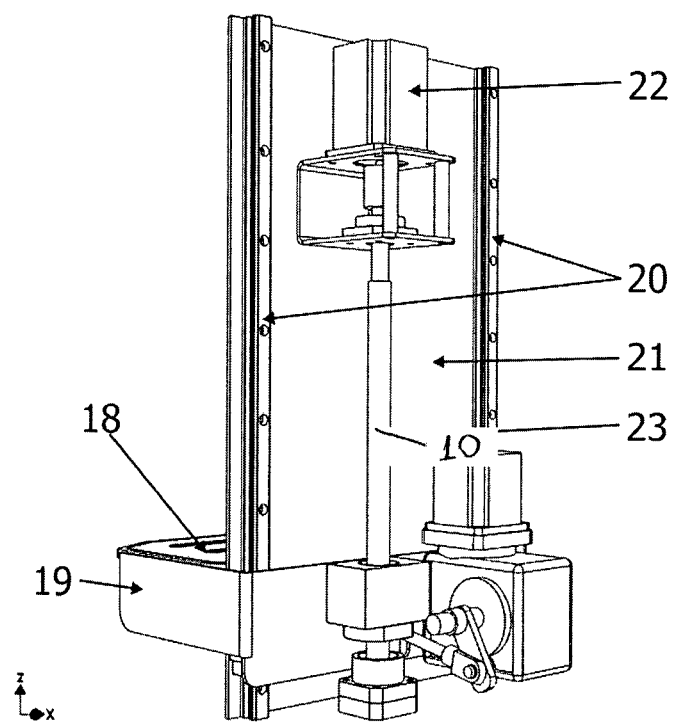
FIG. 5 is a detailed view of the mechanism for the adjustment of the vertical position of the footrest.

FIG. 5 is a detailed view of the mechanism for the adjustment of the vertical position of the footrest. The footrest 18 with its support 19 is drawn along the linear guides 20 which linear guides are supported on a metal surface 21 which, in turn, is fixed on the modular frame 10. The position control is done by an electric stepped motor with a sensor for reading the number of revolutions 22 and a worm gear 23. The electronic board with special software, knowing the number of revolutions done by the electric stepped motor 22, can calculate with millimeter precision the distance between the seat pan and the footrest.

Figure 6:
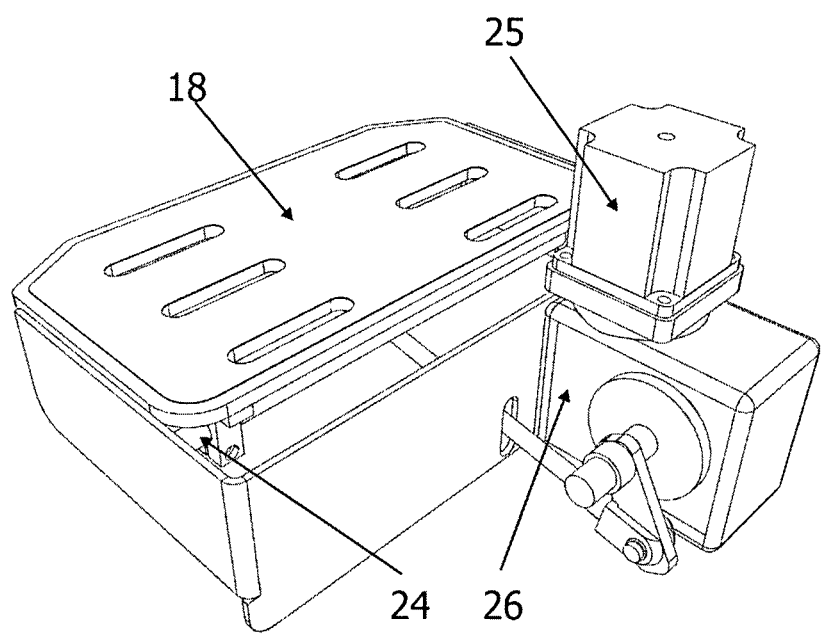
FIG. 6 is a detailed rear perspective view of the mechanism for the adjustment of the footrest reclination.

FIG. 6 is a detailed rear perspective view of the mechanism for the adjustment of the footrest reclination. The footrest 18 is able to move rotationally around a shaft 24 that is fixed on the footrest support 19. An electric stepped motor with a sensor for reading the number of revolutions 25 and by means of a gear motor 26 moves the footrest with center of rotation the shaft 24. The electronic board with the special software, knowing the number of revolutions done by the electric stepped motor 25, can calculate with a very high precision the reclination of the footrest.

Figure 7A:
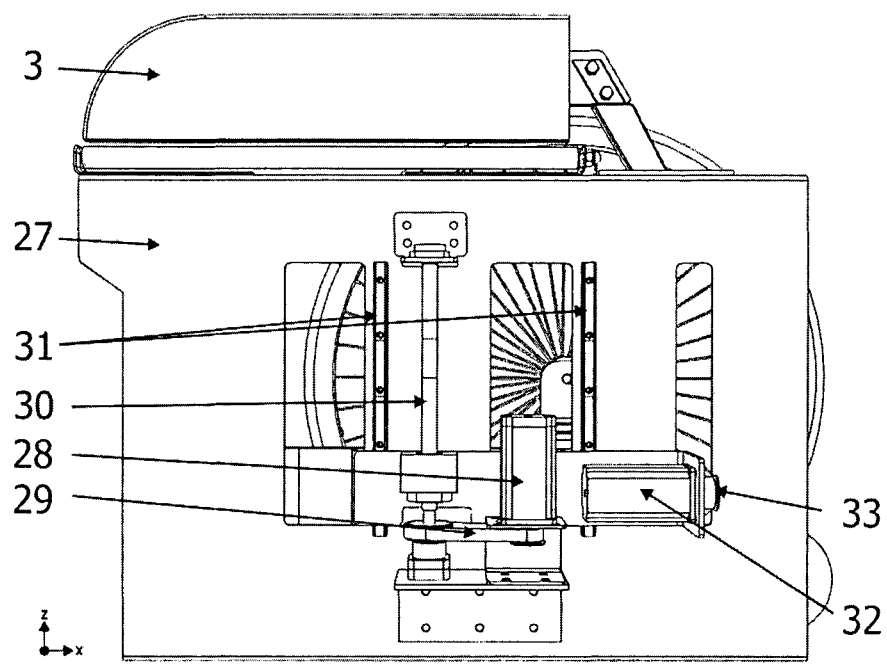
FIG. 7*a* is a detailed inner side view of the left vertical seat pan with the left armrest.
Figure 7B:
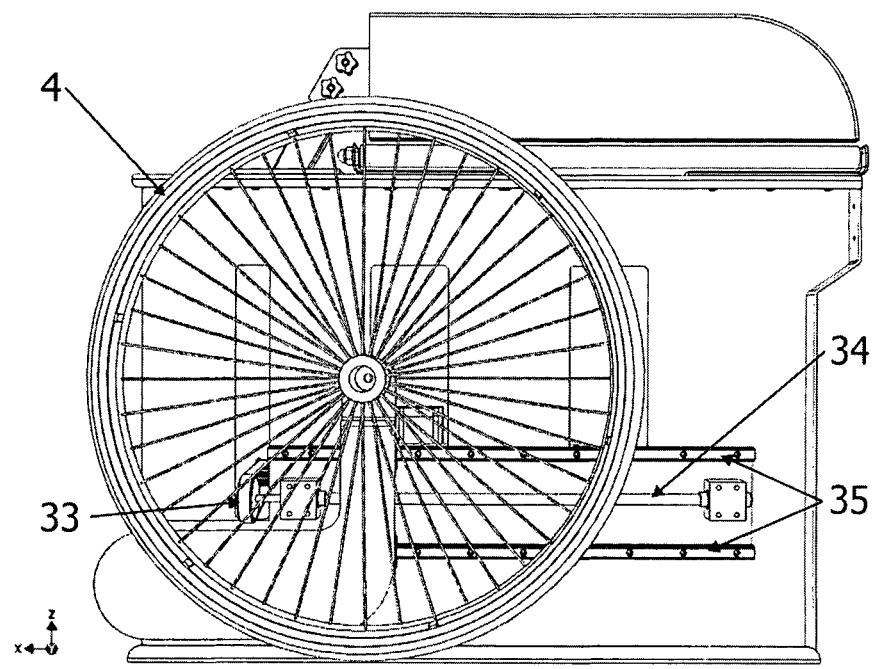
FIG. 7*b* is a detailed outer side view of the left vertical seat pan with the left armrest.

FIG. 7a is a detailed inner side view of the left vertical seat pan 27 with the left armrest 3 and FIG. 7b is a detailed outer side view of the left vertical seat pan 27 with the left armrest 3. The right vertical seat pan with the armrest 27 is almost identical but mirrored. The adjustment mechanisms of the vertical and horizontal position of the left wheel are mounted on the left vertical seat pan 27 and of the right wheel on the right vertical seat pan 27, respectively. The wheel with its support rests on the mechanism for the adjustment of the horizontal position of the wheel and the mechanism for the adjustment of the vertical position of the wheel. In this way, the wheel position can change horizontally, but also vertically. Even though the mechanisms for the adjustment of wheel position are independent to one another, the electronic board with special software assures that the vertical and horizontal displacement of the wheels is always the same. This creates the belief that the wheels are rotating around a common shaft.

The mechanism for the adjustment of the vertical position of the wheel consists of an electric stepped motor with a sensor for reading the number of revolutions 28, conveyor belt and pulleys 29, a worm gear 30 and linear guides 31. The mechanism for the adjustment of the horizontal position of the wheel consists of an electric stepped motor with a sensor for reading the number of revolutions 32, conveyor belt and pulleys 33, a worm gear 34 and linear guides 35. The electronic board with the special software, knowing the number of revolutions done by the electric stepped motor 28 and the electric stepped motor 32, can calculate with a very high precision the horizontal and vertical position of the wheel. Knowing also the exact position of the remaining moveable components, it can calculate with millimeter precision:

The front vertical distance between the foldable seat pan and the ground.

The rear vertical distance between the foldable seat pan and the ground.

The horizontal distance between the seat backrest and the imaginary wheel shaft.

Figure 8:
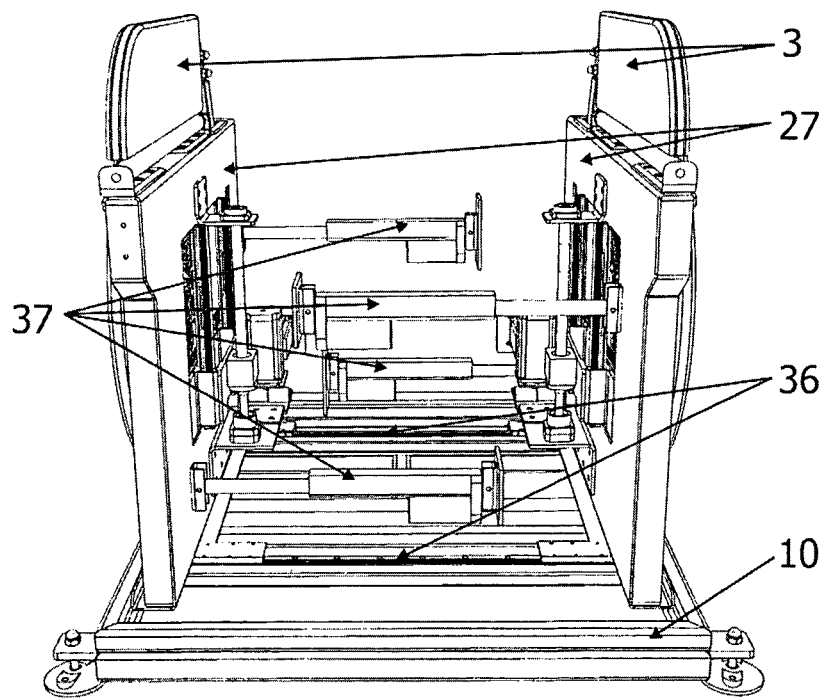
FIG. 8 is a detailed front view of the mechanism for the adjustment of the distance of the side vertical seat pans.

FIG. 8 is a detailed front view of the mechanism for the adjustment of the distance of the side vertical seat pans 27 onto which rest the armrests 3. The two side s vertical seat pans are drawn along two linear guides 36 that are mounted on the modular frame 10 in order to adjust the width between the side seat pans. The width between the side seat pans is controlled by four or more electric pistons 37 which possess digital sensors for reading the position and are fixed on the modular frame 10 (part of the modular frame 10 is hidden in this figure). The electronic board with the special software, knowing the exact position of the electric pistons 37, can calculate with millimeter precision the width of the seated position of the foldable seat.

Figure 9:
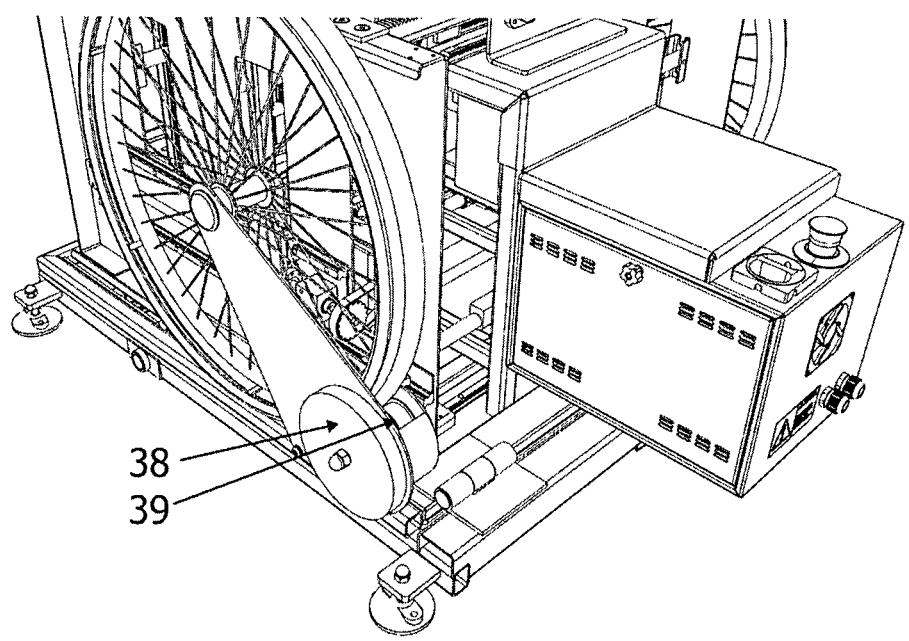
FIG. 9 is a detailed view of the brake mechanism in a mode of embodiment.

FIG. 9 is a detailed view of the brake mechanism in a mode of embodiment. Both the wheels are braked though a mechanical brake 38 of hydraulic, magnetic or electric type. A sensor of rotational speed 39 is installed in each brake or wheel.

Figure 10A:
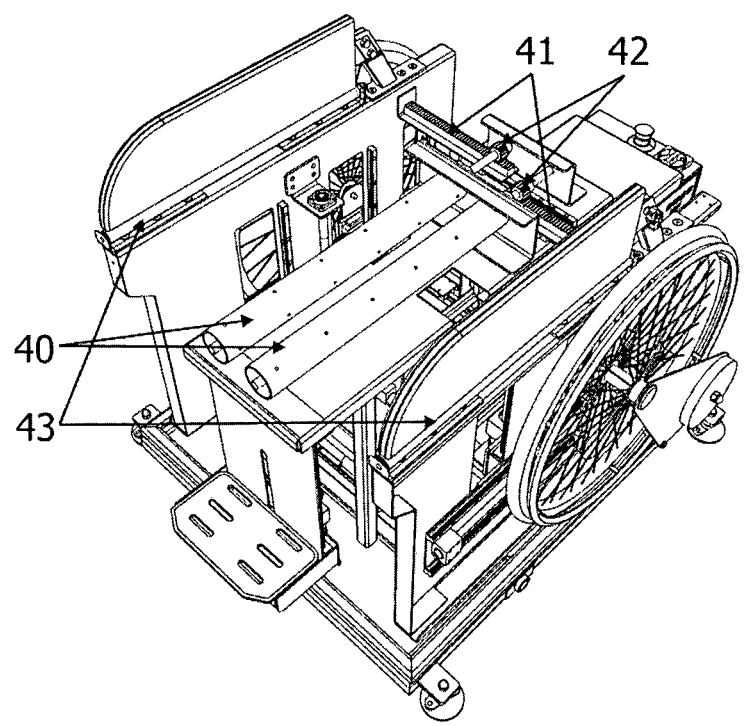
FIG. 10a is a detailed perspective view of the foldable seat position mechanism.
Figure 10B:
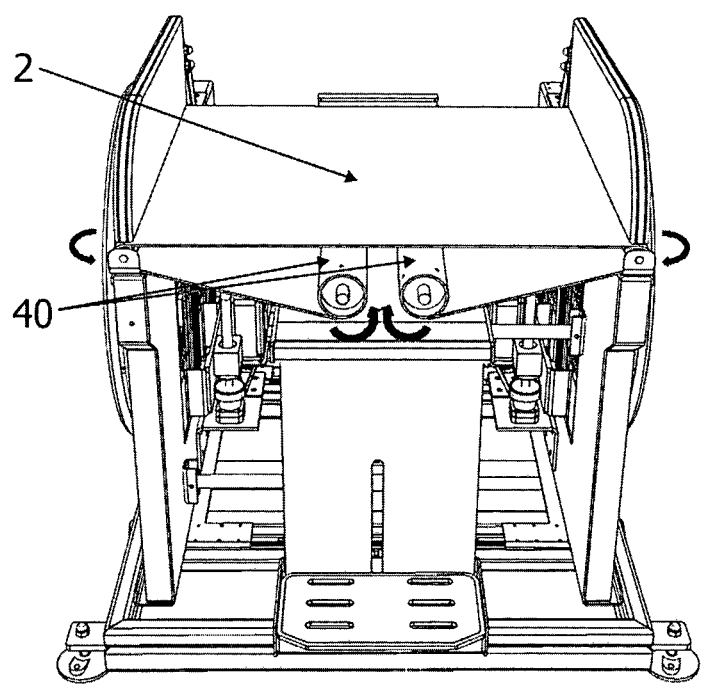
FIG. 10b is a detailed front view of the foldable seat position mechanism.

FIG. 10a is a detailed perspective view of the foldable seat position mechanism 2 and FIG. 10b is a detailed front view of the foldable seat position mechanism 2. The foldable seat position consists of a cloth similar to the one which will be used in the future personalized wheelchair of the occupant. The goal of the foldable seat position mechanism is to enable the seat position to vary widthwise according to the distance defined by the two vertical side seat pans 27. In order the fabric to always be stretched, the excess cloth is wrapped around two rollers 40 which are fixed with bearings on the modular frame from the seat position after it passes above two smaller rollers 43 which are fixed with bearings on the right and left vertical side seat pan, respectively. The rotation of the rollers is achieved using steering racks 41 and a gear 42. As the width of the seat changes, the steering racks 41 and the gears 42 convert the linear movement to rotational by wrapping or unwrapping the cloth of the seated position in the rollers 40.

One or more vertical load sensors are installed on the device. These load sensors determine the total weight of the individual on the simulation device and the position of the center of gravity on the horizontal plane. The position of the center of gravity can be used to calculate the required power of the individual's upper limbs on the simulation device so that the individual can manage to lift a wheelchair to the rear wheels.

The simulator inside the supply and electronic components box 8 contains an electric circuit with at least one microcontroller for which specialized software has been developed. The software can control the positions of all moveable components by reading the sensors, rotating the stepped motors and opening and closing the electric pistons. It can calculate the dimensional parameters based on the positions of the moveable components, control the rotation speed of the wheels and (or) the brakes, read the vertical load sensors and calculate the individual's weight and the center of gravity.

The simulator inside the supply and electronic components box 8 contains also a microcomputer for which specialized software has been developed. The microcomputer is connected to the microcontroller or microcontrollers of the electronic circuit and acts as a browser that provides wired and wireless connection. The advantage of the topology is that the simulator handling and the information display can be done by a computer or any other device with a display system, such as a mobile phone or a small touchscreen computer that can be connected in a wired or wireless way to the microcomputer located inside the supply and electronic components box 8.

The touchscreen computer 7 of FIG. 1 is connected wirelessly to the microcomputer of the simulator and can accept and display all the electronic information that receives by it:
  The positions of all the moveable components.
  The dimensions that result based on the positions of the moveable components.
  The rotation speed of the brakes and (or) wheels.
  The individual's weight and the center of gravity.
The individual on the simulation device or a third person may, using the touchscreen computer 7:
  Change the positions of the moveable components.
  Save the dimensional parameters.
  Recall dimensional parameters he saved in the past.
The software also includes a virtual reality (e.g., a city with its streets) in which the person on the simulation device can see the streets and squares of a particular city and move virtually by rotating the wheels of the simulation device. The software displays the individual's position in the virtual reality, the distance traveled, the power of the individual's upper limbs. The individual on the simulation device or a third person can handle the software.

To quickly and accurately download all the dimensional parameters of a personalized wheelchair there is a specific method of use. The individual whose dimensions will be used for the manufacture of a personalized wheelchair is installed on the simulation device. The individual on the simulation device or a third person adjusts the dimensional parameters with the proposed following order:
  1. Adjustment of the horizontal distance of the vertical side seat pans with the armrests.
  2. Adjustment of the horizontal position of the seat backrest.
  3. Adjustment of the vertical position of the seat backrest.
  4. Adjustment of the vertical position of the footrest.
  5. Adjustment of the reclination of the seat position.
  6. Adjustment of the vertical position of the wheels.
  7. Adjustment of the horizontal position of the wheels.
  8. Adjustment of the reclination of the seat backrest.
  9. Adjustment of the footrest reclination.

Figure 11:
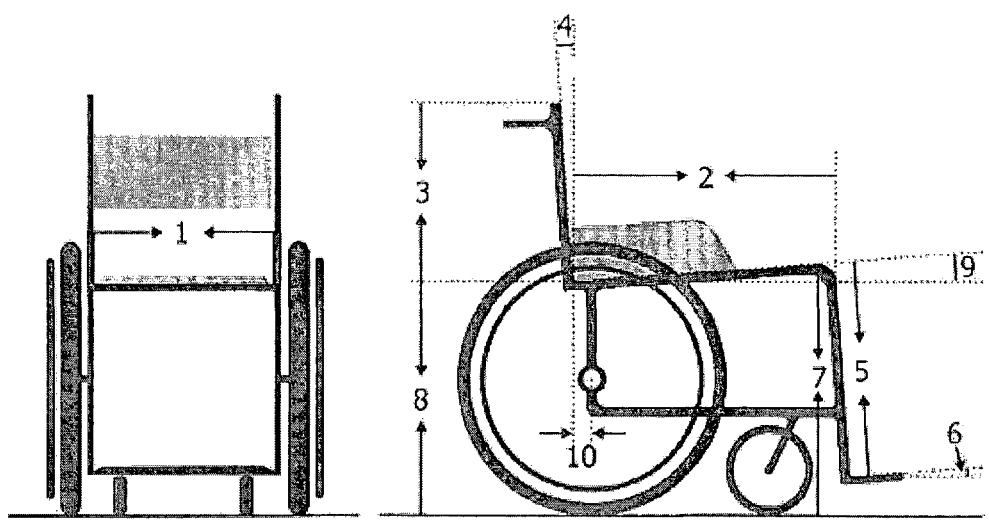
In FIG. 11 are shown the dimensions required for the manufacture of a personalized wheelchair and which can be calculated by the simulator.

Corrections in the adjustments can be made in random order. The resulting dimensions necessary for the construction of the future personalized wheelchair are shown in FIG. 11 and are as follows:
  1. Width of seated position of seat.
  2. Horizontal depth of seated position of seat.
  3. Height of seat backrest.
  4. Reclination of seat backrest.
  5. Distance between the seat pan and the footrest.
  6. Footrest inclination.
  7. Front vertical distance between the seat pan and the ground.
  8. Rear vertical distance between the seat pan and the ground.
  9. Reclination of seat pan.
  10. Horizontal distance between the seat backrest and the wheel shaft.

The invention claimed is:

1. A system for the simulation of a seated position in a wheelchair, the system comprising:
  one or more adjustable components selected from the group consisting of:
    a seat backrest, whose horizontal position being adjustable by a horizontal adjustment means, the seat backrest whose vertical position being adjustable by a vertical adjustment means and whose inclination being adjustable by an inclination adjustment means, two armrests whose horizontal distance, which defines a seat width, being adjustable by a means for an adjustment of a horizontal position of the armrests, a foldable seat pan, whose inclination around a shaft of one modular frame being adjustable by a means for an adjustment of a seat inclination, and a footrest whose vertical position being adjustable by a means for a vertical adjustment of the footrest;

two wheels each having a wheel shaft, whose vertical and horizontal position being adjustable by a means for an adjustment of a vertical and a horizontal position of the wheels; and at least one means for position measurement for determining at least one position of at least one of the adjustable components;

wherein the adjustable components is a plurality of adjustable components including the seat backrest, the two armrests, the foldable seat pan and the footrest, and wherein the adjustable components being used for a determination of all positions of all the adjustable components and allow for a determination of dimensions selected from the group consisting of and which are used for a manufacture of a personalized wheelchair:

a height of a seat backrest of the personalized wheelchair, and tilt of the seat backrest of the personalized wheelchair;

a seat width of the personalized wheelchair;

a horizontal depth of a seat of the personalized wheelchair;

a seat inclination of the personalized wheelchair, and a front height of the personalized wheelchair;

a horizontal distance between the seat backrest and a wheel shaft of the personalized wheelchair, and a vertical distance between a seat pan of the personalized wheelchair and the wheel shaft result in a back height of the personalized wheelchair; and a distance between a seat pan and a footrest of the personalized wheelchair, and an inclination of the footrest of the personalized wheelchair.

2. The system according to claim 1, wherein at least one of the adjustment components includes an electric motor associated with the means for the adjustment of at least one position.

3. The system according to claim 2 further comprising a computer connected or connectable to the means for position measurement of at least one of the adjustment components, the computer being equipped with a display system, wherein the computer comprises means for carrying out the handling of the system.

4. The system according to claim 3 further comprising a magnetic, an aerodynamic brake or the magnetic and the aerodynamic brake mounted on at least one of the wheels or on one brake located on at least one of the wheel shafts and for a simulation of a vehicle resistance during transportation, wherein a rotation sensor is mounted on at least one of the wheels or on at least one of the brakes.

5. The system according to claim 3, wherein the computer including a memory configured to store and execute software instructions which, when a program is executed by the computer, cause the computer to carry out the steps for the determination of all the positions of the adjustment components and enables the determination of dimensional parameters which are necessary for the manufacture of the personalized wheelchair.

6. The system according to claim 5 further comprising means for navigating a wheelchair user in a virtual reality, wherein the system is connected to a software for navigation of the wheelchair user in a state of virtual reality, so that the user has an ability to move on the simulator as if the user moves on a wheelchair in a real environment.

7. The system according to claim 6, wherein the system allows adjusting the wheelchair dependent on a strength and fatigue of the wheelchair user during manual operation of the wheels of the wheelchair for specific wheel positions.

8. A wheelchair simulator system comprising
a frame;
a modular frame articulatably coupled to the frame, the modular frame including a modular frame adjustment mechanism configured to adjust an inclination of the modular frame in relation to the frame;
a backrest connectable to the modular frame, the backrest including a backrest adjustment mechanism configured to adjust a vertical distance of the backrest from a seat, a horizontal distance of the backrest from a front point of the seat, and an inclination of the backrest;
a footrest connectable to the modular frame, the footrest including a footrest adjustment mechanism configured to adjust a vertical position and an inclination of the footrest;
a pair of vertically orientable seat pans connectable to the modular frame, the seat pans including a seat pan adjustment mechanism configured to adjust a distance between the seat pans, each of the seat pans includes a wheel adjustment mechanism configured to adjust a vertical and horizontal position of a wheel supported thereto by way of a wheel shaft, respectively; and
an armrest attachable to each of the seat pans.

9. The system according to claim 8 further comprising a brake in operable association with at least one of the wheels.

10. The system according to claim 8, wherein the modular frame adjustment mechanism includes two swivels connected the modular frame to the frame, and a modular frame electric piston configured to pivot the modular frame about the swivels to adjust the inclination of the modular frame.

11. The system according to claim 8, wherein the backrest adjustment mechanism includes a first backrest electric piston being configured to adjust a vertical distance of the backrest from the modular frame, a second backrest electric piston being configured to adjust a horizontal distance of the backrest from a front point of a seat associated with the modular frame, and a third backrest electric piston being configured to adjust an inclination of the backrest, and wherein the backrest is fixed to a support arm that is associated with the first, second and third backrest electric pistons.

12. The system according to claim 8, wherein the footrest adjustment mechanism includes a vertical adjusting assembly and an inclination assembly, the vertical adjusting assembly includes an electric motor and worm gear assembly configured to adjust a vertical position of a support configured to travel along a pair of linear guides supported by the modular frame, and wherein the inclination assembly includes a shaft supported on the support, a gear motor configured to move the footrest in relation to the support and with a center of rotation the wheel shaft.

13. The system according to claim 8, wherein the seat pan adjustment mechanism includes two linear guides mountable on the modular frame and configured for the seat pans to travel therealong in order to adjust a width between the seat pans by way of one or more seat pan electric pistons.

14. The system according to claim 8, wherein the wheel adjustment mechanism includes a vertical adjusting assembly and a horizontal adjusting assembly, the vertical adjusting assembly includes a pair of vertical linear guides, and a first stepped motor and worm gear assembly configured to vertically move the wheel along the vertical linear guides, and wherein the horizontal adjust assembly includes a pair of horizontal linear guides associated with each of the seat pans, and a second stepped motor and worm gear assembly configured to horizontal move the wheel, the vertical linear guides and the first stepped motor and worm gear assembly along the horizontal linear guides.

15. The system according to claim 8, wherein the modular frame adjustment mechanism, the backrest adjustment mechanism, the footrest adjustment mechanism and the wheel adjustment mechanism each includes a position sensor, respectively.

16. The system according to claim 15 further comprising a computer including a memory configured to store and execute software instructions, which when executed by the computer, cause the computer to carry out steps for controlling any one of the modular frame adjustment mechanism, the backrest adjustment mechanism, the seat pan adjustment mechanism, the footrest adjustment mechanism and the wheel adjustment mechanism, and wherein the software instructions, which when executed by the computer, cause the computer to determine a position by way of the position sensor of any one of the modular frame adjustment mechanism, the backrest adjustment mechanism, the seat pan adjustment mechanism, the footrest adjustment mechanism and the wheel adjustment mechanism.

17. The system according to claim 8 further comprising a seat position mechanism configured to adjust a width of a seat position according to a distance defined by the seat pans.

18. The system according to claim 16, wherein the seat position mechanism comprising:
   a pair of first rollers fixed with bearings on the modular frame;
   a pair of second rollers with one of the second rollers fixed with bearings on each of the seat pans, respectively;
   a cloth wrapped around the first rollers after it passes above the second rollers;
   a steering rack operably associated with each of the seat pans; and
   a gear operably associated with the steering rack and one of the first rollers;
   wherein as the width of the seat changes, the steering racks and the gears convert a linear movement of the seat pans to rotational by wrapping or unwrapping the cloth around the first rollers.

19. A process for adjustment positions of adjustable components of the system of claim 8 for simulation of a seated position in a wheelchair according, the process comprising the steps:
   a) adjusting the horizontal position, the vertical position and the inclination of the backrest by operating the backrest adjustment mechanism;
   b) adjusting the horizontal distance between the armrests by operating the seat pan adjustment mechanism;
   c) adjusting the vertical position and the inclination of the footrest by operating the footrest adjustment mechanism;
   d) adjusting the horizontal and the vertical position of the wheel shaft by operating the wheel adjustment mechanism; and
   e) adjusting an inclination of the seat pan by operating the seat pan adjustment mechanism.

20. A wheelchair seating simulation system for acquiring and adjusting measurements associated with manufacturing a personalized wheelchair while providing a simulated wheelchair based on the measurements to a user, the system comprising:
   a simulated wheelchair configured to seat a user, the simulated wheelchair comprising:
      a modular frame articulatably coupled to a frame, the modular frame including a modular frame adjustment mechanism configured to adjust an inclination of the modular frame in relation to the frame, the modular frame adjustment mechanism including one or more modular frame position sensors;
      a backrest connectable to the modular frame, the backrest including a backrest adjustment mechanism configured to adjust a vertical distance of the backrest, a horizontal distance of the backrest, the backrest adjustment mechanism including one or more backrest position sensors;
      a footrest connectable to the modular frame, the footrest including a footrest adjustment mechanism configured to adjust a vertical position and an inclination of the footrest, the footrest adjustment mechanism including one or more footrest position sensors; and
      a pair of vertically orientable seat pans connectable to the modular frame, the seat pans including a seat pan adjustment mechanism configured to adjust a distance between the seat pans, each of the seat pans includes a wheel adjustment mechanism configured to adjust a vertical and horizontal position of wheels supported thereto each by way of a wheel shaft, respectively, the seat pan adjustment mechanism including one or more seat pan position sensors and wheel position sensors; and
   a computer including a memory configured or configurable to store and execute software instructions, which when executed by the computer, cause the computer to:
      control any one or more of the modular frame adjustment mechanism, the backrest adjustment mechanism, the seat pan adjustment mechanism, the footrest adjustment mechanism, and the wheel adjustment mechanism;
      acquire position data from any one or more of the modular frame position sensors, the backrest a position sensors, the footrest position sensors, the seat pan position sensors and the wheel position sensors;
      acquire load data from one or more loads sensors configured to determine a weight of the user on the simulated wheelchair and to determine a position of center of gravity on a horizontal plane the user on the simulated wheelchair; and
      determine dimensional parameters of the personalized wheelchair based on any of the acquired position data or the acquired load data.

21. The system according to claim 20, wherein the software instructions, which when executed by the computer, cause the computer to further:
   acquire energy data from one or more sensors configured to measure energy costs of the user in different positions and adjustments while seated on the simulated wheelchair;
   determine the position of the wheels best suited to a morphology of the user; and provide virtual reality data to a display viewable to the user on the simulated wheelchair and to navigate a virtual reality wheelchair in a state of virtual reality, so that the user has an ability to move on the simulated wheelchair as if the user moves on a wheelchair in a real environment.

* * * * *